United States Patent
Tietzen et al.

(10) Patent No.: US 10,861,062 B2
(45) Date of Patent: *Dec. 8, 2020

(54) AUTOMATED CAUSE MANAGEMENT

(71) Applicant: EDATANETWORKS INC., Edmonton (CA)

(72) Inventors: Terrance Patrick Tietzen, Edmonton (CA); Ronald Mackay, Edmonton (CA); Timonthy Makoto Yamamoto, Edmonton (CA)

(73) Assignee: EDATANETWORKS INC., Edmonton (CA)

( * ) Notice: Subject to any disclaimer, the term of this patent is extended or adjusted under 35 U.S.C. 154(b) by 234 days.

This patent is subject to a terminal disclaimer.

(21) Appl. No.: 13/756,120

(22) Filed: Jan. 31, 2013

(65) Prior Publication Data
US 2013/0218655 A1    Aug. 22, 2013

Related U.S. Application Data

(62) Division of application No. 12/118,923, filed on May 12, 2008.

(51) Int. Cl.
*G06Q 30/02* (2012.01)
*G06Q 20/12* (2012.01)
(Continued)

(52) U.S. Cl.
CPC ......... *G06Q 30/0279* (2013.01); *G06Q 20/12* (2013.01); *G06Q 20/387* (2013.01);
(Continued)

(58) Field of Classification Search
CPC .... G06Q 30/0279; G06Q 20/12; G06Q 30/02; G06Q 20/387; G06Q 30/0236; G06Q 30/0229; G06Q 30/0232; G06Q 40/12
(Continued)

(56) References Cited

U.S. PATENT DOCUMENTS

| | | |
|---|---|---|
| 6,473,500 B1 | 10/2002 | Risafi et al. |
| 7,856,377 B2 | 12/2010 | Cohagan et al. |

(Continued)

FOREIGN PATENT DOCUMENTS

| | | |
|---|---|---|
| CA | 2546151 | 11/2007 |
| WO | 2005036432 A1 | 4/2005 |

(Continued)

OTHER PUBLICATIONS

World Intellectual Property Office, International Preliminary Report on Patentability dated Nov. 17, 2010, issued in corresponding PCT Application No. PCT/CA2009/000623.

(Continued)

*Primary Examiner* — Mario C. Iosif
(74) *Attorney, Agent, or Firm* — Bradley K. DeSandro; DeSandro Law Group PLLC (57) ABSTRACT

A method, system and computer program for providing a loyalty engine for automated cause marketing. The method can include a charity linking merchants and sponsors to the loyalty system. Once the merchants and the sponsors are linked and the members are registered, merchant defined rules can instruct a loyalty engine as to the level of donations in connection with one or more transactions by a member that is associated to the loyalty program. The loyalty system can include a reporting facility to allow the merchant to track transactions with members in a number of ways. A system is also provided that can consist of a server including the loyalty engine and the charity utility. The charity utility can provide the functions of the method and can be linked to the networked server.

15 Claims, 3 Drawing Sheets

(51) Int. Cl.
*G06Q 20/38* (2012.01)
*G06Q 40/00* (2012.01)

(52) U.S. Cl.
CPC ......... *G06Q 30/02* (2013.01); *G06Q 30/0229* (2013.01); *G06Q 30/0232* (2013.01); *G06Q 30/0236* (2013.01); *G06Q 40/12* (2013.12)

(58) Field of Classification Search
USPC ..................................................... 705/14.27
See application file for complete search history.

(56) References Cited

U.S. PATENT DOCUMENTS

| | | | |
|---|---|---|---|
| 2001/0051875 A1 | 12/2001 | Miller et al. | |
| 2002/0008146 A1 | 1/2002 | Singhal | |
| 2003/0065572 A1 | 4/2003 | McNee et al. | |
| 2003/0158818 A1* | 8/2003 | George | G06Q 20/382 705/64 |
| 2003/0167177 A1* | 9/2003 | Branch | 705/1 |
| 2004/0182922 A1* | 9/2004 | Talarico, Jr. | G06Q 20/28 235/380 |
| 2004/0249752 A1* | 12/2004 | Prato et al. | 705/41 |
| 2005/0080672 A1 | 4/2005 | Courtion et al. | |
| 2005/0203754 A1* | 9/2005 | Coughlin | 705/1 |
| 2006/0111978 A1* | 5/2006 | Tietzen | G06Q 30/0217 705/14.13 |
| 2006/0122874 A1 | 6/2006 | Postrel | |
| 2006/0253320 A1* | 11/2006 | Heywood | 705/14 |
| 2008/0005017 A1 | 1/2008 | Poster | |
| 2008/0263645 A1 | 10/2008 | Renter et al. | |
| 2009/0259499 A1* | 10/2009 | Bhojwani | G06Q 30/02 705/7.32 |
| 2009/0281871 A1 | 11/2009 | Tietzen et al. | |

FOREIGN PATENT DOCUMENTS

| | | |
|---|---|---|
| WO | 2008092279 A1 | 8/2008 |
| WO | 2008148217 A1 | 12/2008 |
| WO | 2008157486 A2 | 12/2008 |

OTHER PUBLICATIONS

European Patent Office, Communication pursuant to Article 94(3) EPC dated Jan. 3, 2014, issued in corresponding European Patent Application No. 09745332.8.
European Patent Office, Extended European Search Report dated Dec. 12, 2012, issued in corresponding European Patent Application No. 09745332.8.
Notice from the European Patent Office dated Oct. 1, 2007 concerning business methods.
United States Patent and Trademark Office, Office Action dated Aug. 6, 2009, issued in corresponding U.S. Appl. No. 12/188,923.
United States Patent and Trademark Office, Office Action dated May 12, 2010, issued in corresponding U.S. Appl. No. 12/188,923.
United States Patent and Trademark Office, Office Action dated Mar. 28, 2012, issued in corresponding U.S. Appl. No. 12/188,923.
United States Patent and Trademark Office, Office Action dated Apr. 12, 2013, issued in corresponding U.S. Appl. No. 12/188,923.
United States Patent and Trademark Office, Office Action dated Apr. 9, 2015, issued in corresponding U.S. Appl. No. 12/118,923.
Canadian Intellectual Property Office, Examiner's Requisition dated Jan. 8, 2016, issued in Canadian Patent Application No. 2,665,871.
United States Patent and Trademark Office, Office Action dated Nov. 9, 2015, issued in corresponding U.S. Appl. No. 12/118,923.
United States Patent and Trademark Office, Office Action dated Aug. 9, 2016, issued in U.S. Appl. No. 12/118,923.

* cited by examiner

AUTOMATED CAUSE MANAGEMENT

CROSS REFERENCE TO RELATED APPLICATIONS

This patent application is a divisional application of U.S. patent application Ser. No. 12/118,923, titled "METHOD, SYSTEM, AND COMPUTER PROGRAM FOR PROVIDING A LOYALTY ENGINE FOR AUTOMATED CAUSE MANAGEMENT," filed on May 12, 2008, which is incorporated herein by reference.

FIELD

The present invention relates to creation and administration of an automated cause marketing system. More particularly, the present invention relates to an automated cause marketing and loyalty system that benefits charities, sponsor organizations, merchants, and customers or members.

BACKGROUND

Methods for charity fundraising need to be drastically altered. Traditionally, charities accepted donations from taxes, public donations, corporate donations, and fundraising drives. More recently, charities have utilized lotteries to attract funds.

These tactics are no longer as effective as they once were. There is an ever-growing list of charities sharing a relatively static source of funds. Many charities are able to raise fewer funds than ever before. Furthermore, the novelty of charities lotteries is beginning to wear off on the public and, therefore, charities are realizing fewer gains each year from both lotteries and other traditional fund raising methods.

Meanwhile, retail businesses face the challenge of maintaining market share and increasing business. Due to the robust economy and healthy business at certain peak times, businesses may need to rely on new mechanisms to increase revenues during non-peak times. Businesses also generally highly value repeat business from customers.

What is needed is a way of attracting new and continuing donations to charities. One way of doing so is to cease attempting to appeal to the public's altruism, and instead offering a solution that financially benefits all parties involved in fundraising, from donors through to the charity itself.

The prior art discloses some attempts to fundraise in a way that benefits donors and others. For example, COMMUNITY SMART™ makes credit cards available, wherein specified donations are made to a charity of the customer's choice.

Other examples include KIDS FUTURES™ and UPROMISE™. These prior art solutions provide co-branded financial cards with a charity as a partner, which are issued to a customer who uses it and the charity shares in the applicable interchange fees.

It should be understood that in this disclosure the term "Partner" refers to an entity, such as one or more merchants, that participates in a loyalty program to build loyalty with customers, and potentially acquire new business, and in exchange is willing to provide a loyalty benefit (e.g. cash, in kind contribution, special reduction in price, donation to a charity, or other promotion). A "Member" refers to the customer or potential customer who is a member of the referred loyalty program referenced.

One of the disadvantages of these prior art solutions is the lack of flexibility in the manner in which transactions triggering donations to the charity must occur. The benefit that a Partner participating in a loyalty program is willing to provide will depend on a particular Partner and their business objectives at a particular time. The prior art solutions do not enable Partner to suitably reflect these changing objectives in the manner in which donations are processed in the context of the loyalty program. For example, a Partner that earmarks certain funds for charitable donations and is reaching the end of its reporting period with unspent funds for charity may have a limited time to boost its donations. The Partner might prefer to make donations in the context of a loyalty program, however, prior art systems do not enable Partners to enhance their donation contributions under the loyalty system to such an end.

Therefore, there is a need for a loyalty program linked to charitable donations that allows the participation of one or more Partners, and the flexibility that enables the charity benefit to be maximized by responding to changing business objectives. There is a further need for a loyalty program that enables multiple Partners to reflect their changing business objectives by dynamically modifying the rules of the loyalty program as they relate to charitable donations. More specifically, there is a need for a loyalty program that enables merchants to customize their loyalty program, including as it related to charitable donations, on the fly, including based on effectiveness and incremental cost.

Many charities have important profile and very significant donor lists. This profile and these donor lists have not generally been leveraged to the benefit of a loyalty program because charities are reluctant to associate their goodwill with a loyalty program, in many cases in large part because the loyalty program lacks transparency to the Members in that they cannot readily track the relationship between their activities within the loyalty program and the donations made to the charity.

There is a further need for a loyalty program that enables Members to obtain data regarding their activities within the loyalty program that are eligible for charitable donations and also obtain data regarding donations made on their behalf to a charity by Partners.

The level of contribution that Partners would be willing to provide to a charity in the context of a loyalty program have been limited in part because prior art solutions did not adequately address the need for business to verify the commercial benefit derived by the Partners. Related charitable donations could be increased if the Partners were given the tools to measure and monitor the effectiveness and incremental cost of their activities involving charitable donations. There is a need therefore for a method, system and computer program that enables Partners to monitor and verify the commercial benefit that they are deriving from the charitable donations, thereby encouraging the Partners to increase their charitable donations.

Another factor that has contributed to reluctance of both Partners and charities to participate in the type of activity described above, and thereby depriving themselves of the mutual benefits, is the fact that most prior art solutions involve (in the context of the particular loyalty program) association with a limited number of Partners. Charities are loathe to bring attention to the fact that they are associating with one merchant, but not a competing merchant, for example, favoured by a number of their donors. This aspect is exacerbated by increased competition for donations by charities, and also the polarization that exists sometimes between the respective customer bases of companies that are highly competitive with one another (especially where comparative advertising is used). There is a further need for a method, system and computer program that addresses this disadvantage by permitting charities to associate loosely with a plurality of Partners, where the Members by selecting one or more of a plurality of Partners, ultimately determine the donations flowing from the Partners to the charity. A system whereby the Member controls the flow of donations and therefore maintains the freedom of choice of the Member tends to be affected by this particular disadvantage to a lesser degree.

Prior art solutions also did not give to the charity: control over the member with respect to communications; the functionality of loyalty tools including member acquisition, retention and rescue; and 100% pass through for donations.

DETAILED DESCRIPTION

General Overview.

The present invention discloses an automated cause management ("ACM") computer program and method ("ACM program") that may provide benefits to several parties involved in fundraising for a charity, including the charity, sponsor businesses, partner businesses, and individuals. The ACM program may also be configured to benefit more than one charity.

Aspects described in this Overview will be more fully described in the relevant sections that follow.

The present invention may provide one or more charities ("Charities") with a new source of funds obtained through allowing friends of a Charity, who are registered members, to transact using a registered financial transaction identification means, such as a financial card, resulting in merchants donating directly to the charity. Such means may be loyalty cards that are associated with loyalty programs that are used to administer aspects of the cards. In the present invention, merchants ("Partners") may pledge to give to a Charity a percentage of revenues from individuals ("Members") who transact at their business. The present invention may provide the Charity and the Partners accurate measurement and reporting on the results.

One embodiment of the invention may enable 100% of Partners' contributions, based on agreed upon conditions, to go directly to the Charity in an ongoing collection effort that goes 365 days per year. In one possible implementation of this embodiment, the Charity may benefit by paying no administrative costs in connection with the loyalty program. Instead, Partners may pay a fee to buy or license the ACM program for the benefit of the recipient Charity.

Another embodiment of the invention may enable a network of Charities (e.g. a national charity with local affiliates) to link together to benefit each Charity in the network. This embodiment is described below in the section entitled "Network of Giving".

The present invention also discloses an original computer program and method for enabling the Charity to leverage large corporate ("Sponsor") relationships. A Charity may recruit Sponsors to distribute benefits as incentives to, for example, their employees in return for employees transacting with Partners who then contribute to the Charity. Thus, the spending of benefits by the employees may accrue at least partially to the Charity. In turn, the Sponsor may be rewarded by an increase in employees' productivity as a result of the incentive.

In one embodiment of the present invention, the incentive may be provided by a Sponsor in the form of a stored value card ("SVC"). Optionally, the SVC must be registered with the Charity and ACM program in order to be redeemed. The Charity may report back to Sponsor regarding how successful registration has been.

Furthermore, the present invention provides the ability for a Partner to communicate directly with another Partner on the service provided for cross promotion offers to attract members to transact with the Partners, resulting in donations to the Charity. It also provides for the Charity to communicate with the Partners on upcoming events, special promotions, prizing opportunities, opportunities for volunteers, the impact of the program, use of funds, and status of fundraising.

The present invention may also provide an accounting of transactions by Members both to the Partner and to the Charity by, for example, use of Member identification numbers, which are described more fully below.

In terms of benefits to a Partner, the present invention may provide tools enabling customer acquisition, retention and rescue. For example, the present invention may provide loyalty tools including a prize module that can set varied numbers of prize opportunities and participation in contests based on pre-selected criteria. Additionally, the present invention may provide market data on customers including preferences, spending habits, and merchant ratings.

System Overview

Figure 1:
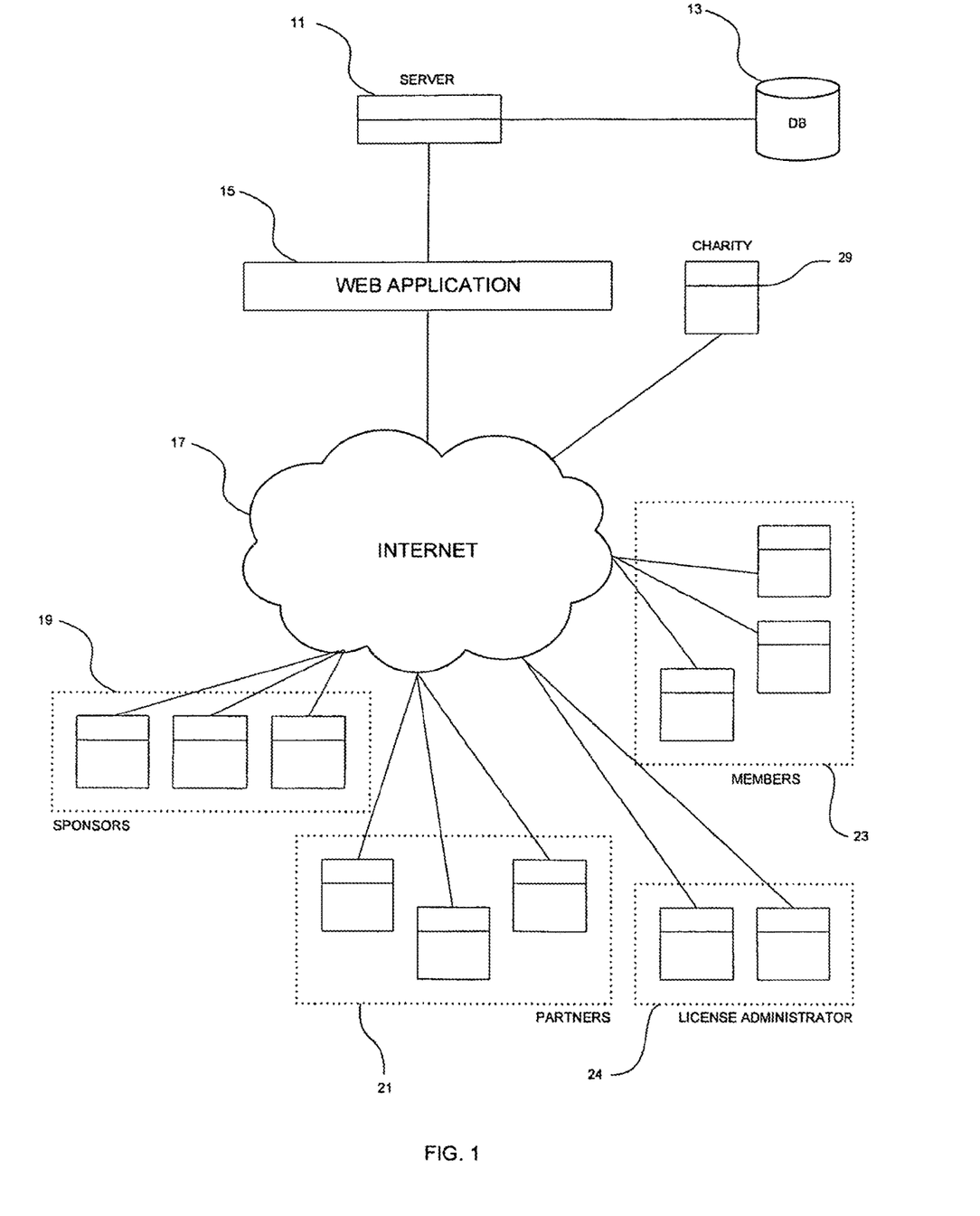
FIG. 1 illustrates one particular embodiment of the system of the present invention.

FIG. 1 illustrates one particular embodiment of the system of the present invention. The internet (17) accessible ACM program platform is housed on a server computer (11).

In one particular implementation of the present invention, the server computer (11) consists of at least one web server (e.g. an IBM™ HTTP Server), at least one application server (e.g. an IBM™ running WEBSPHERE™ software), and at least one database server (e.g. running IBM™ DB2). In addition, in a particular implementation of the present invention, the server computer (11) also includes a server dedicated to importing real time financial data.

One aspect of the server application is that it includes a web utility for publishing a web site to the Internet (17) in a manner that is known. The features of the web site of the present invention are described below.

The server computer (11) interacts with a database (13) that is operable to store a plurality of data instances pertaining to the ACM program. The ACM engine (27) is accessible to the public via a web application (15) that generates a web site accessible to the public, a Member, a Partner, a Charity, a Sponsor, and a License Administrator which enables all of these parties to interact with the ACM engine (27).

The computer program aspect of the present invention comprises a back-end computer program relating to the database (13) and a series of front-end computer programs relating to the web application (15).

Figure 2:
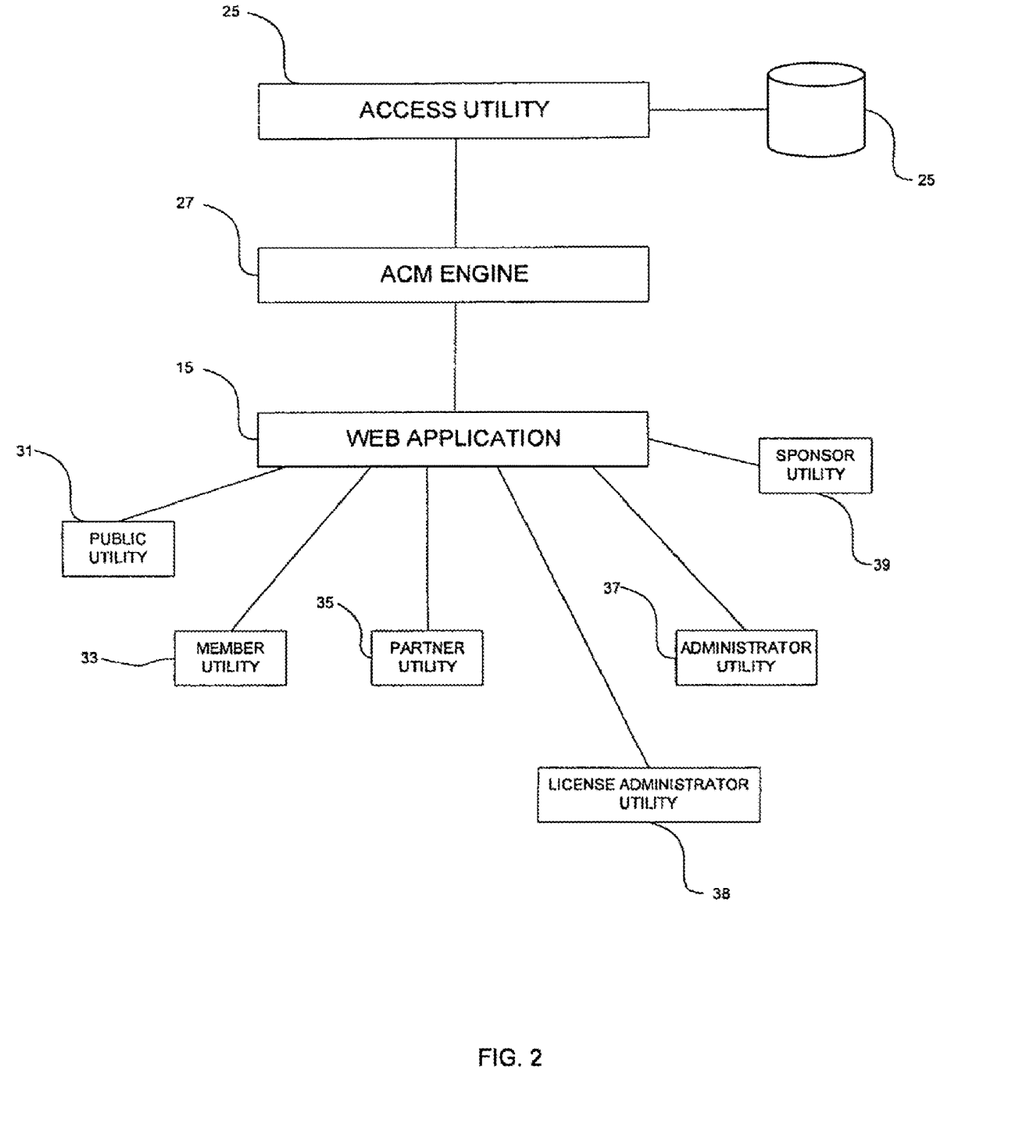
FIG. 2 illustrates the interaction between the database and the web application that comprise a particular embodiment of the present invention.

FIG. 2 illustrates the interaction between the database and the web application as a web site. The web application (15) can be further broken down into sub components, including the Administrator Utility (37), Member Utility (33), Public Utility (31), Sponsor Utility (39), and License Administrator Utility (38). The web application thus permits Partners, Sponsors, Members, the Public, a License Administrator, and a Charity to manage data input to and output from the database (13). Each utility is described in the corresponding section below.

The server computer (11) may also comprise a member identification number generation engine operable to transform a Member's financial transaction identification means number (such as SVC card number or other card number) to a Member identification number ("Member ID").

The back-end computer program may include an access utility (25) that is operable to populate and manipulate the items in the database (13), which itself is operable to store a series of data instances. The database (13) may comprise means operable to associate data instances with other data instances. For example, the means to associate data instances could be implemented in the database (13) as tables. For simplicity, tables will be used to describe the implementation of the database (13), without limiting the scope of the present invention. In the database (13), the tables may include but are not limited to:

A partner table operable to associate a Partner name with a Partner identification number and a plurality of data instances associated with the enablement of various optional functions of the ACM program, each selectively made available to the Partner as set by agreement between the Partner and the Charity. The partner table may also store information relating to benefits or pledge levels to accrue to the Charity based on the Partner's transactions.

A partner offer table operable to store a plurality of thresholds set by a Partner for the purposes of identifying and linking customer actions and demographics, comparison to thresholds and determinate actions for customer retention, acquisition, or rescue. A Partner may desire to use this information for other purposes as well.

A transaction table operable to associate a plurality of Member IDs with data instances associated with a plurality of transactions representing transactions made using the Member's financial transaction identification means (such as SVC or other financial card) at both Partner and non-Partner businesses. The data instances may include Partner ID, location ID, Member ID, transaction date, transaction time, purchase price, and any other relevant information relating to the transaction. There may be additional data instances associated with the transaction table.

A Member ID table operable to associate a Member ID with data instances representing demographic information associated with the Member. The data instances may include gender, age, income, occupation, means of communication and any other relevant information relating to the Member.

A plurality of survey tables operable to associate survey questions with survey responses and to associate survey data with transaction and demographic data for a Member, Partner, or Sponsor.

The plurality of graphical user interfaces may comprise interfaces for each of a Public Utility (31) Charity or Administrator Utility (37), a Sponsor Utility (39), a Partner Utility (35), a Member Utility (33), and a License Administrator Utility (38). The graphical user interfaces may be web pages operable to receive inputs, such as user identifications and passwords that define the content that may be displayed to a particular individual, Sponsor, Partner, Member or License Administrator.

The web application (15) may be operable to display a default web page upon an individual visiting the web site. By default, the web application (15) may provide the Public Utility (31) to the individual. The Public Utility (15) is further described below.

An individual, who may represent a Sponsor, Partner, Member, Charity or License Administrator may access a secure area of the web application. The individual must first sign up with the web site for joining the ACM program. To sign up, the individual may be required to provide a set of information for identification purposes, such as user name and password, or email address and password, for the purposes of future identification with the web site.

The web site may consist of a series of web pages containing fields for obtaining sign-up information from individuals. The web site may also include a plurality of secure areas, provided in a manner that is known. The secure areas may comprise the Member Utility, Partner Utility, Administrator Utility, License Administrator Utility, and Sponsor Utility.

One aspect of the present invention is the collection of information from the Members regarding one or more of their financial transaction identification means such as financial cards. The registered financial transaction identification means information enables the loyalty engine (27) to track financial transactions of the Members, as particularized below.

The financial transaction identification means may include a wide variety of cards such as banking cards or credit cards. In one embodiment of the invention, the financial card is a stored value card. The stored value card may provide a means for a Charity or Sponsor to acquire new Members and means for a Charity or Sponsor to provide prizing to existing Members. The stored value card is described more fully below. It should be understood to those skilled in the art, that in this specification a reference to a stored value card or other financial card could easily be extended to other financial transaction identification means.

The financial transaction identification means data is stored to the database (13) based on processes defined by the access utility (25). In one particular implementation of the invention, financial card identification data may be transformed into a separate member identification number and stored to the database (13) to maintain the security of the financial card data.

Once the requisite sign-up data has been provided by the individual, the individual is registered to the server computer (11), and by operation of the access utility (25) the registered individual is provided access to the functions of the server application accessible to individual, as described below for each of the Member, Sponsor, Charity, Partner and License Administrator.

Figure 3:
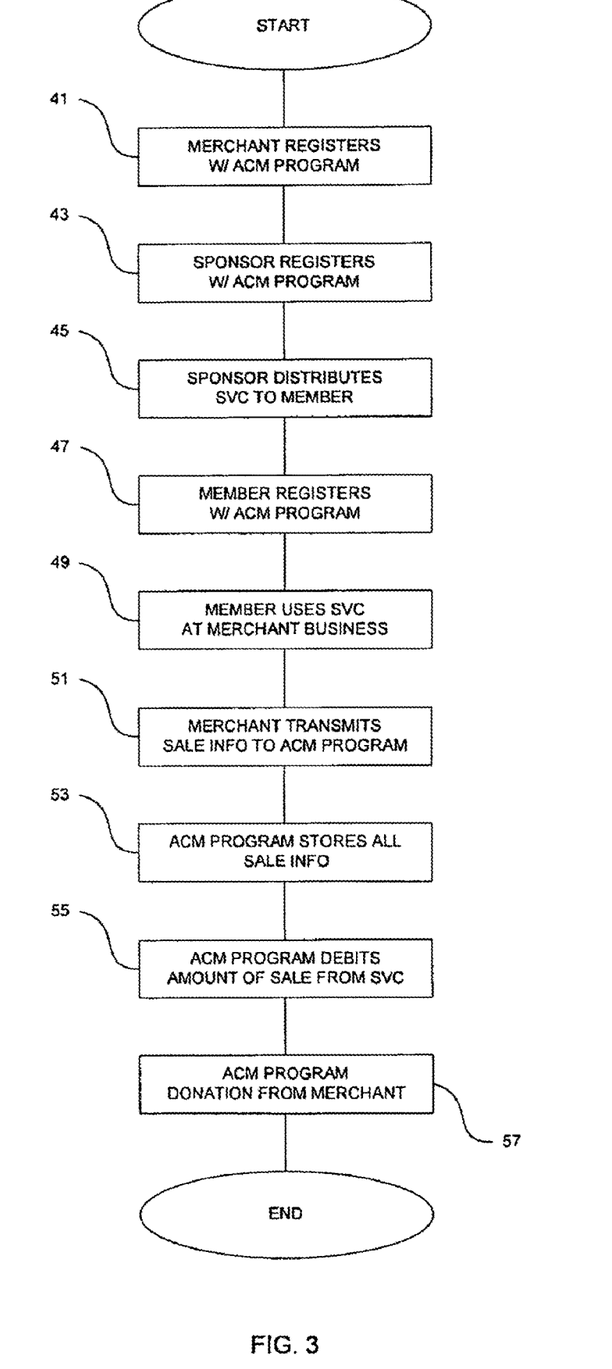
FIG. 3 illustrates one particular embodiment of the method of the present invention from the detailed description set forth below when taken in conjunction with the drawings.

FIG. 3 illustrates the method of the present invention. The method consists of registering a plurality of Partners with the ACM program (41). The plurality of Partners is provided with tools to customize their implementation of the ACM program.

The operator of the loyalty program or ACM program administrator is typically the Charity. However, in one embodiment a Partner may be provided tools to administer its own loyalty program in addition to an existing ACM program.

Typically, the Partners may register (41) with the ACM program without any action required by the Charity. The relationships among the Charity, Partners and Members are governed by rules under which the plurality of Partners may make donations to the Charity based on purchasing activities of Members in connection with the ACM program. Through tools provided by the ACM program, the Charity and each participating Partner define rules for each participating Partner to make donations to the Charity, in conformity with the rules established between the Charity and the particular Partner.

In order to attract Members to the Charity, the ACM administrator may enlist Sponsors who may donate funds, encourage their constituents (such as employees) to register with the ACM program or identify other merchants that may become Partners.

A Sponsor may first register with the ACM program (43). Registration is described above. Once registered, the Sponsor may distribute, or cause to be distributed, financial transaction identification means (such as financial cards (45) or SVCs) providing access to the ACM program and motivating recipients of the financial cards (45) to register with the ACM program. The recipient of a financial transaction identification means may register (47) the financial transaction identification means with the ACM program (43) as described below.

The recipient may become a Member upon registration of a financial transaction identification means.

When a Member initiates a transaction at the place of business of a Partner (49) the Partner may transmit transaction data to the merchant acquirer or card association providing the selected data to the ACM program (51);

the ACM program may store the transaction information (53) and accrue the amount to be committed by the Partner;

in one embodiment of the present invention utilizing a SVC, the ACM program may adjust the value stored on the SVC to reflect the transaction (55); and accrual of a donation to the benefit of the Charity may be triggered by the ACM program and tracked by a Charity account of the ACM program Partner provided by the ACM system (57).

The ACM program platform enables each of the Partners, Members and the Charity to track and monitor the donation activity.

Stored Value Card

A SVC may be modeled as a financial card operable to be fully or partially redeemed by a Member at a plurality of merchant locations. The SVC may be a proprietary card, credit card, bank debit card, or other financial card.

Merchants may be Partners or non-Partners of the Charity. Merchants may join to become Partners of the Charity. Partners may optionally set a target rate to contribute to the Charity.

In one embodiment of the present invention, a SVC may be used for customer acquisition or other purposes. The term "Open-loop SVC" will be used in the case where a Member may redeem value stored in a SVC at either or both of a Partner or non-Partner establishment whereas the term "Closed-loop SVC" will be used in the case where a Member may redeem value stored in a SVC at only Partner establishments. It should be apparent to a person skilled in the art that the following methods and systems utilizing a SVC are easily adaptable to other financial cards or other financial transaction identification means.

Data may be accessed for non-Partner establishments when data sources supplied by card associations is used rather than data supplied by merchant acquirer participants.

Purchases made at a Partner using an Open-loop SVC may result in a contribution to the Charity, and purchases made at a Partner using a Closed-loop SVC (which may only be redeemed at a Partner) may result in a contribution to the Charity. Whether a SVC is an Open-loop SVC or a Closed-loop SVC may be determined by agreement between a Partner and a Charity.

A SVC may be administered by a financial institution or by the Charity. Preferably, a financial institution administers the SVC. Methods of loyalty card administration are known to those skilled in the art.

One aspect of the invention is that the SVC may be used as a tool to attract potential Members to register with the ACM program. In one embodiment of the invention, a potential Member may choose to register with the ACM program for several reasons, including for example that the Member appreciates that the charity will benefit from their purchasing activities as defined by terms of the program or that the Member simply wants to redeem value stored in a SVC.

In another embodiment of the invention, a charity-focused organization (e.g. a Partner, Sponsor, etc.) that may have constituents (e.g. employees, members, cardholders, etc.) may issue unloaded SVCs to some of the constituents and may indicate benefits by registering the SVC with the Administrator or License Administrator using the Administrator Utility or License Administrator Utility. When the recipient of the SVC activates it, the recipient may become a Member of the ACM program.

The SVC may include branding for the charity. Optionally, the SVC may also include branding for other organizations such as one or more Sponsors.

The SVC may be distributed in a variety of ways including, for example, at a reception event held by the Charity or at kiosks administered by the Charity or a Sponsor.

The purchase price of the SVC may include an activation fee which may accrue to the Charity or a Sponsor. The SVC may be purchased by a Member for use or as a gift; or by a Sponsor for use by an employee.

An individual receiving a SVC may be required to first register or activate it as a prerequisite to using it. In the present invention, the registration process may be accomplished by means of a registration utility provided by the front-end computer program. The registration utility may provide a means for a Member to provide to the ACM program demographic information such as age, gender, income, occupation, and any other relevant information relating to the Member. The registration utility may also enable generation of a financial card number in addition to the SVC that may be used to transact at Partners.

Upon registration the back-end computer program generates a Member ID using the member identification generation engine and stores the Member ID in the Member ID table. Once registered, a Member may redeem its value at a Partner store if the SVC is a Closed-loop SVC, or at any store if the SVC is an Open-loop SVC.

Once the Member registers the SVC and/or other financial cards, they may be rewarded by activation of the SVC with a sum of money preloaded onto it, either as an Open-loop or Closed-loop SVC. In another example, the Member may receive a prizing right with a variety of potential prizes. In this example, ACM program may require that the Member answer a skill-testing question or perform some other method of qualification in order to adhere to applicable gaming laws. In either example, the issuer of the card (e.g. Partner, Sponsor, etc.) generally may pay money to the Charity corresponding to the amount stored on the SVC. This money may be considered an indirect donation to the Charity. In one embodiment of the invention, breakage may be maintained by the issuer of the card. This may be especially beneficial where a charity is not permitted to retain breakage while maintaining appropriate charity tax status.

A Member may redeem the value stored on the SVC. Preferably, the Member redeems the SVC at a Partner business. In such instances, the Partner may collect information related to the transaction such as the Partner ID, location ID, SVC card identification number, transaction date, transaction time, purchase price, transaction amount, and any other relevant information relating to the transaction. The Partner then may transmit this information electronically to the back-end computer program. The back-end computer program may transform the SVC card identification number to a Member identification number ("Member ID") using the member identification generation engine. The back-end computer program then may store the Partner ID, location ID, Member ID, transaction date, transaction time, purchase price, transaction amount, and any other relevant information relating to the transaction, and any other information the Charity may choose to store.

Public Utility

The present invention may be accessible to the public. For example, there may be a publicly accessible component of the ACM program that may be used to advertise the ACM program.

Furthermore, the publicly accessible component ("Public Utility") of the ACM program may allow a prospective Member to join the ACM program.

In a first embodiment of the Public Utility, the Public Utility may provide a means to allow a Partner to sign up through a direct link to a secure signup page. The secure signup page may permit a Partner to (i) enroll in the ACM program; and (ii) provide permission to the Charity to collect financial card information on Members. The Charity, in turn, may be required to enable the Partner to collect the pertinent information from Members, such as a SVC identification number that relates a SVC to a particular Member. A Partner able to collect this data is referred to as an "Authorized Merchant Acquirer".

In a second embodiment of the Public Utility, the Partner may sign up through an automatic process whereby card data is authorized and provided by the card issuer (e.g. Visa™, MasterCard™, etc.). In this embodiment, the process may be performed on a secure web page. The Partner may accept contractual terms with the Charity that activates the ACM program. In this embodiment the Partner is not required to be affiliated with an Authorized Merchant Acquirer for data collection. Instead, the card issuer collects and distributes the information about transactions and the Partner may receive only base level access to the ACM program.

In either of the above embodiments the Partner may provide to the ACM program, the Partner's name, address, processor identification number, NAICS (North American Industry Classification System) primary code, percentage pledged to the Charity based on registered transactions, and signature.

A third embodiment of the Public Utility may enable the Partner to implement either of the above two embodiments, and additionally purchase a license from the ACM program provider (such as a software developer) to use the loyalty software features directly for its own customer loyalty program.

Member Utility

Members may access a secure section of the ACM program known as the Member Utility. Each Member may access only the section of the Member Utility corresponding to that Member. In other words, each Member may not access the Member Utility for any other Member.

The Member Utility may provide a set of features to a particular Member as determined by the Charity. The features may include news reporting, surveying, account information, and advertising. The Member Utility may also be operable to enable a Member to search within the offers provided by Partners within the ACM program.

Some other features of the Member Utility may provide a means for a Charity to advertise the goods and services, or the logo of, a Partner or Sponsor which the Member may or may not have previously associated with. For example, the Charity may wish to advertise the logo for "Featured Partners" or "Featured Sponsors".

The account information feature may provide a means for a Member to review the transaction history corresponding to its SVC. There may also be displayed the remaining value on any outstanding SVC and, optionally, a means by which the Member may deposit more money onto the SVC.

The news reporting feature may provide a means by which the Partner may communicate brief messages to the Member. For example, a section of a webpage of the Member Utility may be devoted to headlines that may be set by the Charity.

The surveying feature may provide a means by which the Member may complete surveys deployed by Partners, Sponsors or the Charity. The creation and deployment of surveys is discussed in each of the Partner Utility, Sponsor Utility, and Administrator Utility of this description.

A further aspect of the Member Utility may consist of a Customer Relationship Management or CRM utility. The CRM utility is a known software utility that enables managed communications with customers. The CRM utility can incorporate numerous typical CRM functions as part of a web-enabled ASP application part of the server application. For example the CRM utility may be operable to send messages to a participant mailing list, including for example emails regarding special promotions.

The CRM utility may be provided as a module of the Member Utility. A Member may be permitted, by use of text fields on a web page, to provide the ACM program with the Member's mode of communication, such as a phone number to which text messages may be sent, or an email address to which emails may be sent, using the ACM program. Once a Member provides communication information to the ACM program, a Partner or the Charity may be able to send communications such as offers or promotions to the Member by means of the Partner Utility or Charity Utility, respectively.

Partner Utility

Registered Partners may access a secure section of the ACM program known as the Partner Utility. Each Partner may access only the section of the Partner Utility corresponding to that Partner. In other words, each Partner may not access the Partner Utility for any other Partner.

The Partner Utility may provide a set of features to a particular Partner as determined by the Charity or by agreement between the Partner and the Charity. The features may include reporting features and surveying features.

The Charity may determine the levels of reporting available to the Partner based on factors such as the particular Partner, Partner type (i.e. category of goods or services sold), time of day or other time period, and geographical location. Reporting features are further discussed below.

The Partner Utility may further comprise a Survey Utility operable to deploy customer surveys. Optionally the Partner may selectively deploy a survey to Members that are the Partner's customers. The ACM program may be operable to determine whether a particular Member of a Charity is a customer of the Partner since the ACM program may store information relating to a plurality of purchases made by each Member with each particular Partner. For example, as described above, the back-end computer program may store the Partner IDs corresponding to a Member's transactions.

The Partner Utility may also enable a Partner to manage Partner benefits. For example, a Partner may set its benefits or pledge level (collectively referred to as "benefits") for a given time period set by the Charity. Optionally, the Charity may choose to commit a Partner to certain benefits for a given time period once the Partner sets the benefits at the start of the time period. The Partner may then change the benefits at the end of a period, but there may be automatic renewal of the previous benefits level if the Partner does not make a modification prior to commencement of the next time period.

Furthermore, the Partner Utility may enable a Partner to provide different benefits to the Charity based on transactions with different Members. The Partner Utility may provide a means for the Partner to specify the benefits to the Charity based on certain "BIN" number ranges associated with a plurality of SVCs ("Bin Differentiation"). For example, the SVCs may be manufactured in such a way that the SVC identification numbers are allocated sequentially. In this example, the Partner may provide the Charity a particular benefit for a series of, for example, 100 sequential SVCs and a different benefit for the next 100 sequential SVCs. The Partner Utility may enable the Partner to allocate benefits for any number of such bins.

Reporting Features

The reporting features may enable a Partner to analyze the benefits of the ACM program and the return on investment of providing benefits to a Charity.

As described above, the back-end computer program may be operable to store information relating to transactions such as information discussed in the transaction table described above.

The Partner Utility may provide to a Partner a means to provide reports based on the stored information. These reports are generally of the type to enhance a Partner's business by adapting to demographical statistics.

In one embodiment of the reporting features, the Partner Utility may be operable to report on overall spending per month, by location. Such a report may be of particular relevance to a Partner that may carry on business in more than one location. The report may provide information corresponding to:

1) unique Member visits/transactions: calculated based on the number of unique Member IDs stored in the back-end computer program for the particular Partner ID and location ID, and may be narrowed to a particular time period;

2) total Member visits/transactions: calculated based on the number of transactions stored in the back-end computer program for the particular Partner ID and location ID, and may be narrowed to a particular time period;

3) average amount spent per transaction by Members (in dollars or other currency) per visit: calculated based on the amount spent at the particular Partner ID and location ID divided by the total Member visits, and may be narrowed to a particular time period; and 4) total amount spent by Members over all visits/transactions: calculated based on the amount spent at the particular Partner ID and location ID, and may be narrowed to a particular time period.

In a second embodiment of the reporting features, the Partner Utility may be operable to report on collateral spending by a Member. The Member may be a patron of the particular Partner. The report may provide the spending by that Member at other Partner business locations, broken down by business category. Optionally the report may be displayed graphically in a form such as a pie chart (or other graphical display) with each section of the chart representing a business category. In this embodiment, the Partner does not gain direct access to the information corresponding to another Partner. However, the back-end computer program allows access to certain portions of the information for the purposes of reporting. The report may provide information corresponding to:

Member spending from beginning to end of month by Members who purchase from the Partner and also other Partners: includes the Partner's Member base for a given month, and is calculated based on the total amount spent by those Members on all transactions made with the SVC during the month but not including transactions processed by the particular Partner.

The report may present both the dollar amount (or other currency) of the transactions and a percentage based on the type of goods or services offered. The percentage based presentation may optionally be displayed graphically, for example as a pie chart.

In a third embodiment of the reporting features, the Partner Utility may be operable to report on a weekly spending breakdown. The report may provide information corresponding to:

1) per Member by the day of the week: includes the Partner's Member base since the Partner joined the program, and is calculated based on the total amount spent by those Members on all transactions made with the SVC with that Partner, allocated based on a day of the week the transaction occurred on, and then divided by the number of Members. The result may be displayed graphically, as a bar graph (in the case of a dollar or other currency amount) or a pie chart (in the case of a percentage breakdown).

2) for all Members by the day of the week: includes a particular Member base since the Partner joined the program, and is calculated based on the total amount spent by those Members on all transactions made with that Partner, allocated based on a day of the week the transaction occurred on, and then divided by the number of Members. The result may be displayed graphically, as a bar graph (in the case of a dollar or other currency amount) or a pie chart (in the case of a percentage breakdown).

In a fourth embodiment of the reporting features, the Partner Utility may be operable to report on total spending reported by Members' age and gender for a particular Partner's type of goods or services offered. The report may provide information corresponding to:

monthly spending for Members per age group for all female Members, male members or gender-undisclosed member: includes the Partner's Member base for a given month, and is calculated based on the total amount spent by each of a plurality of defined age segments among Members for each gender among the set {female, male, undisclosed} on all transactions made with the SVC during a month.

The report may present both the dollar amount (or other currency) of the transactions and a percentage based on the type of goods or services offered. The dollar amount (or other currency) based presentation may optionally be displayed graphically, for example as a bar graph. The percentage based presentation may optionally be displayed graphically, for example as a pie chart.

A prospective Partner that chooses not to use the reporting features may choose to act as a Sponsor, which may enable the party to have advertising presence on the ACM website and may also enable the party to use the Survey Utility, described below.

Advantages to a Partner

The present invention may provide several financial advantages to a Partner, including 1) The Partner may deploy customer acquisition, customer retention, or customer rescue (reacquiring a customer that has ceased to transact or reduced transactions with a business) offers.

a. The offers may be rewards or other incentives designed to attract business.

Offers may be a promotional code to be used or redeemed at a Partner's business.

c. Offers may be a prizing opportunity to Members of a Partner or Members of the ACM program that have not previously transacted with the Partner.

The Charity may implement the offers as an optional module to the Partner. In this case, the Partner may be required to pay an additional fee to purchase the rights to use the offer module.

For the purposes of customer acquisition, customer retention, and customer rescue a Partner may promote its business to customers or Members that are not yet customers by sending them a special offer. The offer utility may be automatic or manual. In the case of manual offer, the Partner may send, using a means of selection on the front-end computer program, an offer to a particular Member. In the case of automatic offer, the Partner may set, using the front-end computer program, thresholds for a plurality of offers based upon customer history. The thresholds may be stored in the back-end computer program. In this case the back-end computer program may automatically deliver the offer to Members of the Partner exceeding the set thresholds.

2) A Partner may increase incremental sales by analyzing prior attempts to do so, and adapting its business practice accordingly. The analysis of prior attempts for increasing incremental sales may be accomplished using the reporting features as described above.

3) A Partner may allocate benefits regionally. For example, the Partner may use Bin Differentiation in conjunction with deployment of particular bin numbered SVCs to different regions. In such a way, the Partner can allocate an optimal benefit based on statistical return on investment at each of its locations, as provided by the reporting features.

4) A Partner may deploy a customizable survey for completion by Members that transact with the Partner. Surveying is described more fully below.

5) A Partner may leverage business-to-business relationships for the purpose of increasing sales. Preferably, a Partner will deal with a non-competing other Partner. For example, a Partner may offer another Partner's services as a reward to Members that it transacts with. This may result in benefits where a Partner views another Partner's services or goods as a commodity. Offers and rewards are described above.

6) A Partner may realize increased revenue at targeted periods by offering promotions. For example, the Partner may learn from the reporting features that its sales suffer on a particular day of the week as compared to other days of the week. The Partner may choose to selectively make offers to Members to incentivize transacting with the Partner on the particularly poor business day.

7) A Partner may be introduced to new customers, as it may deploy offers to Members of the Charity that are not yet customers of the Partner.

8) A Partner may receive increased feedback from customers as a result of using the survey utility described below.

9) A Partner may receive increase support from the local community as a result of its charitable interest.

Survey Utility

The present invention discloses a Survey Utility that may offer a Partner the opportunity to further enhance customer relationships using measured results. The Survey Utility may provide a Partner the ability to reward customers based on past customer history and/or survey results to offer incentives for further business opportunities.

By comparing the results between retail locations, and Partners' base survey goals, a Partner may ensure that it is maximizing customer satisfaction. For example, the Partner may evaluate current service levels or evaluate which aspects of service are appreciated and not appreciated. The Partner may then make adjustments accordingly.

The Survey Utility may also be made available to a Sponsor. This may provide an incentive to attract Sponsors who may wish donate directly to the Charity rather than based on Member purchases, but still wish to benefit from demographic data made available through the Survey Utility. The use of the Survey Utility by a Sponsor may also be extended to provide customizable questions by the Sponsor to obtain additional customer data. This embodiment may or may not be tied to a financial card transaction data. The deployment of these surveys may be associated with Member's transactions at particular Partners that carry or associate themselves with a given Sponsor's goods and/or services.

Creation

The Survey Utility may provide for creation of a survey. The creation process first requires creation of a group of questions. A Partner or Sponsor may add one question at a time to the survey. There may be many question types to choose from. The Partner or Sponsor may also delete or reorder questions. All operations may be provided by the front-end computer program. The survey may be stored in a survey table.

There may be various types of questions provided by the Survey Utility including single answer selection, yes/no selection, multiple answer selection, short text entry, and long text entry.

The single answer selection may be provided by a selection means such as a radio button or a drop down selection box. The yes/no selection may be provided by a selection means such as a check box or a drop down selection box. The multiple answer selection may be provided by a plurality of selection means such as check-boxes. The short text entry may be provided by a single line text field. The long text entry may be provided by a text box.

Deployment

A Partner may use the survey utility to create a survey deployed as either a "Visit Survey" or a "Contest". A Visit Survey may be sent to a Member after they transact at a Partner location. It may be set up by specifying the question group to use, the effective dates, and the trading area where the Visit Survey is to be available. A Contest may be made available to all Members. Upon filling out the Contest's questions a Member may be entered to win a prize. It may be set up in the same way as a Visit Survey, but more information may be required such as, for example, a contest description.

Results

Members may complete a survey using the front-end computer program, which may be operable to display the series of single answer selection means, yes/no selection means, multiple answer selection means, short text entry means and long text entry means set up by the Partner.

The results of the survey may be stored by the back-end computer program in a survey table. The back-end computer program may record the completion rate among Members to whom the survey was sent. A Partner or Sponsor may adjust survey questions accordingly to attempt to receive a high completion rate for a subsequent survey.

A Partner's or Sponsor's purpose for reviewing survey results may be to resolve individual customer issues based upon survey results and spending history rather than having to pursue the traditional method of using follow-up telephone calls. For example, a Partner or Sponsor may rescue dissatisfied customers by sending them a special offer, which is described above.

In one embodiment of generating offers based on the survey results, an offer may be sent to a Member based on a threshold set by the Partner. The Partner sets the thresholds (as described above in the Partner Benefits section) for these offers and the back-end computer program may automatically deliver the offer to the Member when a threshold is exceeded.

Automated Sweepstakes

A further method of attracting new Members to or retaining existing Members within the ACM program may be to provide an automated sweepstakes utility. A particular Partner may also be given the functionality to offer automated sweepstakes to its customers that are Members by accessing the automated sweepstakes utility through the Partner Utility.

In one embodiment of the automated sweepstakes utility, the ACM program may be operable to randomly select a Member ID from the ACM computer program database as a winner. In a second embodiment of the automated sweepstakes utility the ACM program may transmit a list of Member IDs to an external sweepstakes business which may return a selected Member ID to the ACM program.

The Member ID corresponding to the selected Member (the "winner") may be notified electronically using a means of contact stored in the Member ID table. The automated sweepstakes utility may optionally require the winner to sign off on receiving the prize.

Optionally, reminder notifications may be sent by the ACM program until a sign off is received from the winner. If the winner does not sign off within a set period of time, there may be a new winner selected.

Optionally, the winner's first and last name may be automatically displayed on a website of the sweepstakes house or the ACM program.

Sweepstakes opportunities may be selectively applied according to rules set by the Charity or Partner including by SVC type (Open-loop SVC or Closed-loop SVC), bin range, Member's transaction history, promotional code or other rule. Furthermore, a sweepstakes may be a single contest or may be repeated. Where it is repeated, the Charity or Partner may realize an ease in set up time since the sweepstakes functionality and implementation may be reused.

Sweepstakes opportunities may also be used to reward Members for completing a survey on a transaction or for providing marketing information Online Store The ACM program may optionally include an Internet-based store accessible through the Public Utility. The store may facilitate marketing a Charity to potential new Members.

Any profit made at the store may be donated to the Charity. Products or services provided by the store may include inventory in the form of in-kind gifts provided by a Partner, a Charity's own inventory, SVCs (Open-loop SVCs or Closed-loop SVCs), or other third party merchandise.

Administrator Utility

A Charity may access a secure section of the ACM program known as an Administrator Utility using the front-end computer program, which may be operable to access all data instances stored in the back-end computer program.

The Administrator Utility may provide a means for the Charity to administer the ACM program. The Administrator Utility may include a range of tools enabling the Charity to create communications, such as to encourage support by Members by referring Partners by advertisement on an ACM program website, management of a news aspect of the website, Partner or Sponsor brand identification (such as a logo) placement on the website, or other functionality. The Administrator Utility may also include a calendar tool to schedule staged communications directed at Members, Partners, and Sponsors, and may be geared toward managing relationships between these parties. The Charity may wish to manage these relationships for any of a number of reasons. The Administrator Utility may also provide reporting features accessible to the Charity corresponding to each Partner and each Member that has registered with the ACM program. The functionality of these reporting features is the same as those reporting features provided by the Partner Utility.

Possible Advantages to a Charity

The present invention may provide several advantages to a Charity, including

1) The present invention may allow a Charity to retain 501C tax status in the United States, or similar status under other tax regimes. This is described above in the section entitled "Stored Value Card".

2) The Charity may be able to recruit Members that otherwise may not have become donors of the Charity.

3) The present invention may promote transactions between Members and Partners creating donations to a regional and/or national Charity.

4) The present invention may promote transactions and resulting donations by allowing Sponsors such as product manufacturers to promote their products, which may be sold by Partners of the ACM program.

Sponsor Utility

Sponsors may be corporate organizations or similar groups that operate within one of the Charity's regions. The role of a Sponsor is to assist the Charity in acquiring new Members in addition to being a contributor/donor to the Charity. For example, a Sponsor may be a local corporation that is a large employer. The Sponsor may distribute SVCs to its employees. The Charity thus may attract new Members while the Sponsor may realize productivity gains from its employees as a result of the new incentive. Another example of a Sponsor may include a consumer product company that desires to help the Charity while also securing positive public relations. This type of Sponsor may also wish to donate products for use in sweepstakes or offers as described above. Another example may be a financial institution that could contribute stored value cards or other incentives to encourage people to become members. Another example may be a merchant who is a Partner already affiliated with the Charity.

The Sponsor Utility may also provide access to the reporting features as described above. A Sponsor, by agreement with the Charity, may be provided access to reporting features corresponding to transactions processed by a plurality of Partners or a plurality of Members. For example, the Sponsor may be granted access to reporting features corresponding to the Members that use SVCs provided by the Sponsor.

The Sponsor may elect to support time-based events that allow for contribution matches with preferred merchants, all merchants, certain SVC bin ranges, etc.

As a secondary option a Sponsor may elect to leverage the Charity's Partners/merchants by using Closed-loop SVCs as incentives for further transactions within the plurality of Partners. In other cases, where additional market data is desired, the SVC may be deployed as Open-loop SVCs.

The Sponsor donating the funds on each SVC may receive back part or all of the value of the SVC if it is never registered with the ACM program. The remainder of the value may accrue to the Charity.

License Administrator Utility

A License Administrator Utility may be provided by the present invention in order for the Charity to enable a third party to administer aspects of the ACM program such as the Member Utility or Partner Utility.

For example, a License Administrator may use the License Administrator Utility to create a survey associated with a sweepstakes. The process to accomplish this is described above in the Partner Utility section. The License Administrator Utility may also provide a means for a License Administrator to manage prize allocation for offers or sweepstakes provided by the Charity, a Partner, or a Sponsor.

The License Administrator Utility may also provide a means for a License Administrator to administer the reporting features, such as reporting to Partners on demographics, survey results, etc. as described in the Reporting Features section.

The License Administrator Utility may further provide a means for a License Administrator to enroll new Sponsors, create and display news items, or modify the look and feel of the Public Utility and Member Utility area of the ACM program.

Network of Giving

The ACM program described above may generally apply to a single charity that may operate in a single region. The Network of Giving (NOG) is another embodiment of the invention that may provide a linkage for a network of Charities to operate the ACM program on a larger scale basis.

In the ACM program described above, the Administrator may generally be the Charity. In a NOG embodiment the Administrator may be a Charity or may be an organization whose role is not as a Charity but may be to solicit national (or multi-regional) charities to participate in a national (or multi-regional) program. The Administrator may include a national administrator and a regional administrator, but the two roles may be carried out using a single entity. In the following discussion, where the term "Administrator" is used, either the national administrator or the regional administrator could carry out the function. If the national administrator and regional administrator are separate entities of a Charity, the national administrator may define rules by which incoming donations are split between the national administrator and regional administrator.

The NOG embodiment may also include a License Administrator that actually maintains the ACM program while the Administrator may manage allocation and relations between the regional Charities.

The Administrator may define one or more regions for which an implementation of the NOG embodiment may be active. A region may be a geographic area, but need not be contiguous. A national region may be defined to include the regions or to comprise the geographical areas not already included in regions defined by an Administrator. A national region may also include non-geographic national Partners, Sponsors, and charities that transact on the Internet.

A Charity within a NOG may be a single charity or a plurality of charities that are associated with one another. The plurality of charities may be within the same region or different regions, so long as the regions are included in the NOG.

This embodiment may provide advantages over the localized ACM program described above. For example, large multi-regional or national Sponsors (such as national retailers, large manufacturers, or governmental agencies) may not be familiar with local charities and may prefer to benefit multi-regional or national Charities. These Sponsors may then enroll and encourage their employees to join the program through the techniques described above. This may help overcome a local Charity's lack of ability to affiliate with national merchants by allowing the national entities to affiliate themselves with the NOG and having access to the regional and local charities.

Members may be attracted to the NOG through various means including gift card promotions (such as the use of SVCS) or surveys. In either case, the gift cards or surveys may be implemented regionally, to take into account the regional basis of the NOG. Surveys may also comprise a union of national and regional questions. Surveys may also be provided by Sponsors in addition to by Partners. A Charity, Partner, Partner location, or Sponsor may define prizing in association with Surveys. One or more Partners or Partner locations may be associated with each other to implement cross-promotional prizing and offers.

Members may join as a referral from a specific Charity, the Administrator or with no referral. Based upon the Member's referral choice at signup (which may be recorded and stored during enrollment using the Public Utility) and Partner locations with which the Member transacts, expected payments by a Partner may be shared among the Charities designated by the multi-regional or national chain, Administrator and, if applicable, a License Administrator. The allocation of payments may be divided based on predetermined formulas or ratios. For example, sharing may be allocated based upon how a Member transacts (online versus brick and mortar or physical location), where a member transacts (i.e. ACM program region) and where he/she resides (e.g. address specified during enrollment). This data may all be associated with the registered SVC or other registered financial cards. Alternatively, sharing may be allocated based on the Member's preferences, which may be provided by the Member using the Member Utility.

Sharing may also be based on cross regional split rules. A cross regional split may occur when a Member from one region transacts at a Partner location in another region. If a national charity is not affiliated with a regional charity in the region in which the transaction takes place, but is associated with a regional charity in the region from which the Member originates, then the national charity may receive the donations raised, such that it may be regarded as the regional charity in the region in which the transaction takes place.

Members that are associated with the NOG may be provided with a Member Utility that is operable to search offers based on the regional location of the Member. The Member may also be given access to offers in other regions within the NOG if desired, for example where the Member travels to another region within the NOG.

Partners may be associated with the NOG embodiment of the ACM program by the Administrator or License Administrator, if applicable. For example, Partners that are multi-regional or national chains (which may or may not include franchises) may enroll through the Administrator (the national charitable organization). When a new area/region is activated in the ACM program, outlets of the multi-regional or national chain may become part of the local ACM program. Alternatively, the Administrator may choose not to enroll the local outlet of the multi-regional or national chain in a region where the particular chain presents a conflict with a current Sponsor. When a Member transacts at a Partner outlet, benefits pledged may be shared between the local charity and the multi-regional or national charity selected at a ratio that may be determined by the Partner chain or by the national charity. The donation level applicable to a Charity (which, as described above, may include multiple charities or charity locations), may be defined at the charity level.

In one aspect of the NOG embodiment, the national administrator may be responsible for adding all Partner chains and the regional administrator may be responsible for rejecting the addition of individual (i.e. regional outlets of) Partner chains, with the further approval of the national administrator.

A Partner chain may register all of its locations, and may allocate different donation rules for franchised locations as compared to non-franchised locations. Each location in the chain may make offers depending on the rules set for the chain, but each location may also override offers or surveys if so desired. A Partner that is a chain rather than a single location may be associated with a plurality of Partner ID numbers. For example, each outlet of the chain may be allocated a Partner ID number, and the headquarters of the chain may be allocated a separate Partner ID number. The headquarters of the chain may be allocated the Partner ID number even though it may not conduct transactions at that location. This may be useful where the Partner wishes to access features available through the Partner Utility, such as reporting features.

The Administrator of the NOG embodiment may seek other Sponsors to enroll in the ACM program, become multi-regional or national Partners and expect that their transactions will result in donations to the spectrum of charities within the NOG.

The Administrator may specify the regions in which the NOG applies. Regions may be defined as one or more geographic areas, which need not be contiguous.

Optional Embodiments

The ACM program may provide a media utility. The media utility may include media friends of the Charity to promote the ACM program. The media friend may be rewarded by having the Charity display the media friend's logo on the ACM program website. In turn, the Charity may be rewarded by attracting new Members and Partners due to advertising donated by the media friend. The media utility may also provide for additional survey questions to be presented to new Members upon registration of a SVC. The additional survey questions may relate to which media friend referred the new Member and other question related to the advertisement, such as the time and date it was received by the new Member. The survey results may be used to promote or demote successful or unsuccessful media friends, respectively. For example, a media friend that attracts many new Member may be rewarded with a more prominent logo on the ACM program website than a media friend attracting less referrals.

Another optional embodiment of the present invention may allow a Partner to contract with a service provider (such as a software developer) to purchase direct rights to use the ACM program for non-Charitable means. In this embodiment, the Partner may have its own database of customers in addition to the customers attracted through the Charity.

Yet another optional embodiment of the present invention may allow two or more Charities to collaborate on a special event. In this embodiment, the two or more Charities may distribute SVCs that require registration on a shared ACM program website. Donations accruing through the ACM program may be split among the Charities, and the Charities each receive access to the expanded customer list, which optionally can also be copied to each Charities' own ACM program database. Furthermore, the collaboration among the two or more Charities may provide for time differential donation amounts being generated. This may allow for Partners or Sponsors to support the Charities, and provide incentives to the participating Charities to promote the Partners' and Sponsors' participation.

A further embodiment of the present invention may enable an event based loyalty program. For example, some loyalty and charity fundraising may be performed through special events. In this embodiment more than one Charity may come together for a special event, pool their members, and share proceeds. The ACM program may provide the capability to combine multiple member databases and add and/or delete merchants to provide loyalty for special events. Event based transactions processes may differ substantially between those held by regional and by national charities. In one embodiment the Administrator may be informed about additional financial card holders and special rules for sharing Merchant commitments based upon the Member's charity affiliation and BIN range of a Member's financial card. The Administrator Utility may enable the Administrator to combine the relevant data from the Charities' ACM program databases to implement the event based loyalty program.

Event based activities may be used for other purposes. Events may include a sporting event or a community effort to raise funds for a specific purpose, and may be used in association with the Network of Giving. Partners may choose to associate with these events to provide time limited promotions, such that the promotion has a certain beginning time and ending time. A financial transaction identification means (such as a SVC) may be provided to new or existing Members, to be used in conjunction with the event. The financial transaction identification means may be operable to enable the Member to take advantage of the Partners' promotions at certain times as specified by the Partner. For example, a golf course may offer a special during a time which is typically hard to attract golfers. The Partner may then use the Partner Utility to track information associated with the utilization of the event based promotion by Members. Thus, the Partner may be provided a valuable tool for market research.

A yet other optional embodiment of the present invention may allow real time data to be communicated to Members transacting with Partners. For example, when the ACM program receives transaction information from a Partner relating to a particular Member, the ACM program may communicate with the Member in real time. Communication may be made using any messaging medium such as text messaging or email. One possible use of this functionality could include delivering a survey to the Member relating to the specific transaction that may have just occurred. Another possible use of this functionality could include providing the Member with a promotional code for use upon the next visit to that Partner. This functionality may also be extended, for example by incorporating Bin Differentiation.

Another optional embodiment of the present invention may assist in attracting Members to transact with additional Partners. A Member's transactions may be tracked by the ACM program. The list of Partners that the Member has transacted with may be compiled, and the ACM program may provide an offer to the Member corresponding to one of the Partners that does not appear on this list. The offer may be communicated to the Member using the CRM utility of the Member Utility. The offer may also be from Partners with whom a Member has recently transacted, providing to the Member retention offers, thereby promoting transactions between Partners and regional or national Charities.

What is claimed is:

1. A method performed by an Internet server hardware system executing a software application, the method comprising:

receiving, for each of a plurality of charities, charity information from a network location associated with the charity, wherein the charity information defines at least one geographic region associated with the charity;

receiving, for each of a plurality of merchants, merchant information from a network location associated with the merchant, wherein the merchant information includes a geographic address of the merchant and a donation formula for the merchant;

receiving, for each of a plurality of sponsors, sponsor information from a network location associated with the sponsor;

receiving, for each of a plurality of members, member information from a network location associated with the member, wherein the member information includes a stored value card identifier associated with a stored value card corresponding to one said sponsor and a currency amount;

generating with a member identification generation engine, a member identifier from the stored value card identifier included in the member information;

storing the member identifier in a member ID table;

receiving, at the Internet server hardware system from one or more merchant transaction computers, transaction information relating to a plurality of commercial transactions conducted by a plurality of members and merchants conducting commercial transactions, wherein the transaction data for each said transaction data is derived from:
  the date, the time, and transaction amount for the transaction;
  member transaction data including a Bank Identification Number (BIN) for a financial card that is registered to the member; and
  merchant transaction data settled by a merchant acquirer for the merchant;
and
upon the receipt of the transaction information from one said transaction with one said merchant that includes the merchant information of the one said merchant, the stored value card identifier associated with the stored value card involved in the transaction, and a currency amount of the transaction:
  updating the currency amount for the stored value card corresponding to the stored value card identifier included in the transaction information using:
    the current value of the currency amount for the stored value card;
    and
    the currency amount of the transaction;
  generating, with the member identification generation engine, a member identifier associated with the stored value identifier included in the transaction information;
  and
  upon determining that:
    the member identifier generated from the transaction information corresponds to a data instance in the member ID table;
    the geographic address of the one said merchant identified in the transaction information is within one of the at least one geographic region associated with one said charity;
    and
    the stored value card identifier is associated with the one said charity;
  then:
    updating the current value of the currency amount for the stored value card using a donation by the merchant to the one said charity calculated using:
      the currency amount of the transaction;
      the donation formula in the merchant information for the one said merchant; and
      the current value of the donation by the merchant to the one said charity;
    sending a survey pertaining to the sale to the logical address network location of a corresponding one said member who conducted the transaction with the one said merchant;
    receiving, in response to the survey, a survey response pertaining to the sale from the network location of the one said member;
    differentiating and associating the Bank Identification (BIN) number to a promotional code so as to be differentiated by the stored value identifier included in the transaction information;
    and
    sending to the logical address network location of the corresponding one said member who conducted the transaction with the one said merchant, in response to the receiving of the survey response pertaining to the transaction, the promotional code for use by the corresponding one said member in a forthcoming transaction with the one said merchant.

2. The method claimed in claim 1, wherein:
the Internet server hardware system further comprises a web server; and
the steps further comprise:
  receiving a request from a client requesting service of a web page;
  retrieving, using information in the request, data to be contained in the requested web page; and
  serving, in response to the request, the requested web page containing the retrieved data, wherein the retrieved data is selected from the group consisting of:
    the charity information for one said charity;
    the merchant information for one said merchant; the sponsor information for one said sponsor; and the member information for one said member.

3. The method as defined in claim 1, comprising the further step of the one or more charities defining the rules under which it will receive donations based on the one or more purchases made by each of the one or more members using each of the one or more members' one or more financial cards.

4. The method claimed in claim 1, comprising the further step of the one or more charities defining rules that specify the manner in which the donation is received.

5. The method claimed in claim 1, comprising the further step of the one or more charities defining rules that specify the manner in which the donation is dispersed to any one or more beneficiaries of the one or more charities.

6. The method as defined in claim 1, wherein the one or more charities receive the donations based upon a geographical location of each of the regional charities and a geographical location of the purchases transactions made by the one or more members.

7. The method claimed in claim 1, wherein when the geographic address of the one said merchant is not within the defined geographic region associated with the one said charity, updating a donation currency amount of the merchant for a default said charity using:
  the currency amount of the transaction;
  the donation formula in the merchant information for the merchant; and
  the current value of the donation currency amount for the merchant for the default said charity.

8. An Internet server hardware system comprising at least one server, the server being configured to:
  receive, for each of a plurality of charities, charity information from a network location associated with the charity, wherein the charity information includes a geographic address of the charity;
  receive, for each of a plurality of sponsors, sponsor information from a network location of the sponsor;
  receive, for each of a plurality of members, member information from a network location associated with the member, wherein the member information includes a stored value card identifier associated with a stored value card corresponding to one said sponsor and a currency amount;
  generate with a member identification generation engine, a member identifier from the stored value card identifier included in the member information;
  store the member identifier in a member ID table;
  receive, for each of a plurality of merchants:
    merchant information from a network location associated with the merchant,
    wherein the merchant information includes a geographic address of the merchant
    and
    a donation formula for the merchant;
  receive, at the server from one or more merchant transaction computers, transaction information relating to a plurality of commercial transactions conducted by a plurality of members and merchants conducting commercial transactions, wherein the transaction data for each said transaction data is derived from:
    the date, the time, and transaction amount for the transaction;
    member transaction data including a Bank Identification Number (BIN) for a financial card that is registered to the member; and
    merchant transaction data settled by a merchant acquirer for the merchant;
  and
  upon the receipt of the transaction information from one said transaction with one said merchant that includes the merchant information of the one said merchant, the stored value card identifier associated with the stored value card involved in the transaction, and a currency amount of the transaction:
  update the currency amount for the stored value card corresponding to the stored value card identifier included in the transaction information using:
    the current value of the currency amount for the stored value card;
    and
    the currency amount of the transaction;
  generate, with the member identification generation engine, a member identifier associated with the stored value identifier included in the transaction information;
  and
  upon a determination that:
    the member identifier generated from the transaction information corresponds to a data instance in the member ID table;
    the geographic address of the one said merchant identified in the transaction information is within a defined geographic region associated with the one said charity;
    and
    the stored value card identifier is associated with the one said charity; then:
  update the current value of the currency amount for the stored value card using a donation by the merchant to the one said charity calculated using:
    the currency amount of the transaction;
    the donation formula in the merchant information for the one said merchant; and
    the current value of the donation by the merchant to the one said charity;
  send a survey pertaining to the transaction to the network location associated with a corresponding one said member who conducted the transaction with the one said merchant;
  receive, in response to the survey, a survey response pertaining to the sale from the network location associated with the one said member;
  differentiate and associate the Bank Identification (BIN) number to a promotional code so as to be differentiated by the stored value identifier included in the transaction information;
  and
  send to the logical address network location of the corresponding one said member who conducted the transaction with the one said merchant, in response to the receiving of the survey response pertaining to the transaction, the promotional code for use by the corresponding one said member in a forthcoming transaction with the one said merchant.

9. The Internet server hardware system as defined in 8, wherein the at least one server includes a web server configured to:
  receive a request from a client requesting service of a web page;
  retrieve, using information in the request, data to be contained in the requested web page; and
  serve, in response to the request, the requested web page containing the retrieved data, wherein the retrieved data is selected from the group consisting of:
    the charity information for one said charity;

the merchant information for one said merchant; the sponsor information for one said sponsor; and the member information for one said member.

10. The Internet server hardware system as defined in claim 8, wherein when the geographic address of the one said merchant is not within the defined geographic region associated with the one said charity, the at least one server is configured to update a donation currency amount of the merchant for a default said charity using:
the currency amount of the transaction;
the donation formula in the merchant information for the merchant; and
the current value of the donation currency amount for the merchant for the default said charity.

11. The Internet server hardware system claimed in claim 8, wherein the at least one server provides a web interface for the one or more charities to define rules under which they will receive donations from the plurality of merchants in connection with one or more transactions.

12. The Internet server hardware system claimed in claim 8, further comprising a transaction facility operable to process financial transactions for the one or more charities based on one or more transactions between at least one of the plurality of merchants and the at least one of the plurality of members based on rules defined by the at least one of the plurality of merchants.

13. The Internet server hardware system claimed in claim 12, wherein the one or more charities receive the donations based upon their respective geographical locations and a geographical location of the transactions made by at least one of the plurality of members.

14. A non-transient computer readable medium comprising software executable by an Internet server hardware system, the Internet server hardware system performing a plurality of steps, wherein the steps include:
receiving, for each of a plurality of charities, charity information from a network location associated with the charity, wherein the charity information includes a geographic address of the charity;
receiving, for each of a plurality of merchants, merchant information from a network location associated with the merchant, wherein the merchant information includes a geographic address of the merchant and a donation formula for the merchant;
receiving, for each of a plurality of sponsors, sponsor information from a network location associated with the sponsor;
receiving, for each of a plurality of members, member information from a network location associated with the member, wherein the member information includes a stored value card identifier associated with a stored value card corresponding to one said sponsor and a currency amount;
generating with a member identification generation engine, a member identifier from the stored value card identifier included in the member information; storing the member identifier in a member ID table;
receiving, at the Internet server hardware system from one or more merchant transaction computers, transaction information relating to a plurality of commercial transactions conducted by a plurality of members and merchants conducting commercial transactions, wherein the transaction data for each said transaction data is derived from:
the date, the time, and transaction amount for the transaction;
member transaction data including a Bank Identification Number (BIN) for a financial card that is registered to the member; and
merchant transaction data settled by a merchant acquirer for the merchant;
and
upon the receipt of the transaction information from one said transaction with one said merchant that includes the merchant information of the one said merchant, the stored value card identifier associated with the stored value card involved in the transaction, and a currency amount of the transaction:
updating the currency amount for the stored value card corresponding to the stored value card identifier included in the transaction information using:
the current value of the currency amount for the stored value card; and
the currency amount of the transaction;
generating, with the member identification generation engine, a member identifier associated with the stored value identifier included in the transaction information;
and
upon determining that:
the member identifier generated from the transaction information corresponds to a data instance in the member ID table;
the geographic address of the one said merchant identified in the transaction information is within a defined geographic region associated with one said charity;
and
the stored value card identifier is associated with the one said charity;
then:
updating the current value of the currency amount for the stored value card a donation by the merchant to the one said charity calculated using:
the currency amount of the transaction;
the donation formula in the merchant information for the one said merchant; and
the current value of the donation by the merchant to the one said charity;
sending a survey pertaining to the sale to the logical address network location of the one said member;
receiving, in response to the survey, a survey response pertaining to the sale from the network location of the one said member;
differentiating and associating the Bank Identification (BIN) number to a promotional code so as to be differentiated by the stored value identifier included in the transaction information;
and
sending to the logical address network location of the corresponding one said member who conducted the transaction with the one said merchant, in response to the receiving of the survey response pertaining to the transaction, the promotional code for use by the corresponding one said member in a forthcoming transaction with the one said merchant.

15. The non-transient computer readable medium claimed in claim 14, wherein the steps further comprise, for each request received from a client requesting service of a web page:
retrieving, using information in the request, data to be contained in the requested web page; and serving, in response to the request, the requested web page containing the retrieved data, wherein the retrieved data is selected from the group consisting of:
the charity information for one said charity;
the merchant information for one said merchant; the sponsor information for one said sponsor; and
the member information for one said member.

\* \* \* \* \*